United States Patent
Payne et al.

(10) Patent No.: US 9,661,860 B2
(45) Date of Patent: May 30, 2017

(54) MEATBALL ROLLING MACHINE

(76) Inventors: Richard A. Payne, Plymouth, WI (US); George Hausladen, Green Bay, WI (US)

(*) Notice: Subject to any disclaimer, the term of this patent is extended or adjusted under 35 U.S.C. 154(b) by 349 days.

(21) Appl. No.: 12/932,956

(22) Filed: Mar. 10, 2011

(65) Prior Publication Data

US 2012/0231106 A1  Sep. 13, 2012

(51) Int. Cl.
 A22C 7/00 (2006.01)
 A21C 3/08 (2006.01)

(52) U.S. Cl.
 CPC .............. *A22C 7/0015* (2013.01); *A21C 3/08* (2013.01)

(58) Field of Classification Search
 CPC .... A21C 3/02; A21C 3/06; A21C 3/08; A21C 11/008
 USPC ....... 425/141, 195, 288, 327, 332, 335, 363, 425/364 R, 371, 372, 391, 443, 456
 See application file for complete search history.

(56) References Cited

U.S. PATENT DOCUMENTS

| | | | |
|---|---|---|---|
| 3,704,664 A * | 12/1972 | Fisher, Jr. | 99/450.2 |
| 3,973,895 A * | 8/1976 | Hayashi | 425/372 |
| 4,128,369 A * | 12/1978 | Kemerer et al. | 425/113 |
| 4,192,639 A * | 3/1980 | Jones, Jr. | 425/372 |
| 4,209,540 A * | 6/1980 | Jones, Jr. | 426/414 |
| 4,265,608 A * | 5/1981 | Tunador et al. | 425/149 |
| 4,516,291 A * | 5/1985 | Goldberger et al. | 426/513 |
| 4,741,263 A * | 5/1988 | Ueno et al. | 99/450.2 |
| 4,767,638 A * | 8/1988 | Uhrovic | 426/500 |
| 4,883,417 A * | 11/1989 | Morikawa et al. | 425/140 |
| 4,902,524 A * | 2/1990 | Morikawa et al. | 426/503 |
| 4,904,491 A * | 2/1990 | Morikawa et al. | 426/502 |
| 5,078,585 A * | 1/1992 | Morikawa et al. | 425/162 |
| 5,266,341 A * | 11/1993 | Morikawa et al. | 426/231 |
| 5,330,344 A * | 7/1994 | Konig | 425/321 |
| 5,537,919 A * | 7/1996 | Bielfeldt et al. | 100/48 |
| 5,538,414 A * | 7/1996 | Kobayashi et al. | 425/321 |
| 5,562,028 A * | 10/1996 | Bielfeldt et al. | 100/311 |
| 5,575,203 A * | 11/1996 | Bielfeldt | 100/311 |
| 5,579,687 A * | 12/1996 | Bielfeldt | 100/311 |
| 5,674,547 A * | 10/1997 | Vrouwenvelder | 426/500 |
| 5,899,321 A * | 5/1999 | El-Ibiary | 198/807 |
| 6,053,721 A * | 4/2000 | Bonnet et al. | 425/193 |
| 6,103,288 A * | 8/2000 | Kobayashi et al. | 426/503 |
| 6,248,384 B1 * | 6/2001 | Morikawa et al. | 426/496 |
| 6,254,372 B1 * | 7/2001 | Morikawa et al. | 425/329 |
| 2012/0219693 A1 * | 8/2012 | Juravic et al. | 426/657 |

* cited by examiner

*Primary Examiner* — Seyed Masoud Malekzadeh
(74) *Attorney, Agent, or Firm* — Weiss & Weiss; Philip M. Weiss

(57) ABSTRACT

A food product rolling machine which comprises a combination of lower, upper and reciprocating functions with a vertical adjustment between upper and lower conveyers for the manufacture of a more precise food product.

29 Claims, 5 Drawing Sheets

MEATBALL ROLLING MACHINE

FIELD OF THE INVENTION

The present invention relates to a meatball rolling machine which comprises a combination of lower, upper and reciprocating functions with a vertical adjustment between upper and lower conveyers for the manufacture of a more precise meatball.

BACKGROUND OF THE INVENTION

U.S. Pat. No. 3,797,069 relates to an apparatus for extruding spherically shaped food products such as meatballs, dumplings, and the like which are extruded onto a moving conveyer from horizontally elongated extrusion apparatus which overlies and extends transversely the conveyer. The apparatus comprises a ure plates mounted in the bottom of the chamber for reciprocation lengthwise of the chamber chamber for containing an extrudable quantity of food, a pair of superimposed apert and means for reciprocating the plates. This device uses an extruder to cut and make the shapes.

U.S. Pat. No. 4,229,859 relates to a process and apparatus for making substantially disked shaped meat patties having substantially uniform weight from substantially cylindrical masses of ground meat. The cylindrical mass of ground meat are placed on the conveyer and while the conveyer is continuously advancing they are flattened by at least one flattening means such as a piston press, to form patties which look like, taste like, and have the texture of homemade patties. This device is used to flatten patties and does not make spheres.

U.S. Pat. No. 7,217,117 relates to a device for shaping portions of minced meat such as steak and meatballs. The invention relates to arrangements comprising combinations of: a mincer providing a stream of mince meat, conveying means with an endless band for transporting the stream, exiting from the mincer and arranged along the conveyer means, means for cutting the stream into portions and means for lateral shaping, acting simultaneously on both sides of the stream to shape the contour of the portions. This device is a machine which uses nests or blocks to surround the meat and form it into a meatball.

Current meatball rolling equipment consists of a conveyer which moves meatballs away from the forming machine. The meatballs are conveyed under a plate which moves transversely to the direction of the conveyer. This plate contains some type of a pattern which prevents slippage of the meatballs while in contact with the plate. The plate can either have a pattern in the surface contacting the meatballs or the pattern can be attached by adhesive or any one of mechanical fastening devices such as staples, screws and nuts. This plate must have a fine adjusting mechanism to make incremental and very small adjustments, less than 0.01 inches, to regulate the process. The conveyer speed and the transverse speed can be independently controlled.

Current machines consist of a product conveyer which moves the meatballs from the machine. A transverse drive moves the upper conveyor at a right angle to the direction of travel. An upper conveyor replaces the plate on the machine.

SUMMARY OF THE INVENTION

The present invention comprises a product conveyer which moves the meatballs from the forming machine. A transverse drive moves an upper conveyer at a right angle at the direction of travel. An upper conveyer replaces the plate on the machine of the prior art. The upper conveyer moves at a higher speed than the lower conveyer. This has the effect of imparting a top spin on the meatball. This forward motion caused by the difference of conveyer speeds along with the transverse motion of the top conveyer adds an additional axis of rotation to the meatball rolling process.

It is an object of the present invention to provide a hydraulic adjusting mechanism to the fine adjustment required to control the meatball rolling process.

The present invention comprises a machine which conveys patties, balls or other shapes from a forming or other processing machine on a lower conveyer to an area of a machine between two conveyers which are precision adjusted to set a dimension. The upper conveyer is run at a longitudinal speed greater than the longitudinal speed of the lower conveyer. While the product is being conveyed between the conveyers longitudinally, the upper conveyer is moving laterally which inparts a motion on the product to form it into near spherical shapes.

It is an object of the present invention for the conveyer to comprise a counter weight feature which minimizes the vibration imparted by the lateral motion. It is an object of the present invention for the motions of the two conveyers to disburse the product laterally which negates the need for other equipment to disperse laterally before going into a cooking, frying, baking, freezing or dehydration process.

The present invention comprises a lower conveyer which is moving longitudinally conveying product away from a shape generating machine to an area under an upper conveyer which has a faster longitudinal speed.

It is an object of the present invention for the upper conveyer to be smaller laterally than the lower conveyer and the upper conveyer reciprocates laterally which force is dampened by a counter weight system, by a mechanical, hydraulic, electrical or pneumatic power, thereby inparting a multi-direction motion on the product which creates a near spherical shape while dispersing the product laterally on the lower conveyer.

It is an object of the present invention for the combination of the lower, upper and reciprocating functions with a precision vertical adjustment between upper and lower conveyers to create a more precise meatball.

The lateral dispersion of the product on the lower conveyer by multi-directional rolling action allows the product to increase the efficiency of a subsequent operation of cooking, frying, freezing and dehydrating. The operation is much more efficient than that done in the prior art. First, the dispersal can be controlled by conveyer settings which eliminate the need for conventional dispersal equipment. Second, by adjustment of the speeds of the various functions, the product is efficiently placed longitudinally on the belt in a manner which is more efficient for operations after the rolling process is completed. The combination of the lower, upper, and reciprocating functions with a precision vertical adjustment between upper and lower conveyers allows for more efficient processing of the meatballs by eliminating the need for other equipment (such as shuttle conveyers), and by presenting the meatballs for more efficient cooking, frying, baking, freezing or dehydration of the product.

The upper conveyer drives a belt longitudinally while it reciprocates laterally. It is an object of the present invention for the drive unit to comprise a pulley or sprocket driven by a motor or other power device. It is an object of the present invention for the pulley to have an opening in the center to allow the drive shaft to move laterally within the pulley or sprocket while imparting forward motion on the belt. It is an object of the present invention for two rollers to contact the interior of the sprocket or pulley to allow the drive unit to impart two directions of motion, longitudinally to the belt while accommodating lateral motion to the conveyer.

It is an object of the present invention for the machine to comprise a lower conveyer which is driven by a power source independent of the other conveyer functions which controls the longitudinal speed of the belt on the conveyer, while there is an apparatus which is used to precisely control the distance between the upper and lower conveyer.

It is an object of the present invention for the upper conveyer to have an independent power source to control the longitudinal speed.

It is an object of the present invention for the upper conveyer to be laterally narrower than the lower conveyer. It is an advantage to have the upper conveyer as stated above since the prior art uses a stationary surface which imparts no forward motion to the product.

It is an object of the present invention for the upper conveyer to reciprocate laterally at a speed which is independently controlled from other functions of the conveyer.

It is an object of the present invention for the upper conveyer to move laterally while driving the belt longitudinally by a system of pulleys, sprockets, rollers and a reciprocating shaft. It is an object of the present invention for the force and vibration of the lateral conveyer to be laterally dampened by a counter weight system.

Between the two conveyers, the meatballs are rolled to a precise shape and weight and laterally dispersed on the wider lower belt. They are then conveyed on the lower conveyer to other processing operations.

The present invention comprises a machine comprising a lower conveyer upon which product having various shapes is deposited. The conveyor is controlled by independent speed controls. The upper conveyer is narrower laterally, than the lower conveyer. The belt on the upper conveyer is independently controlled at a faster speed than the lower conveyor. The distance between the upper conveyor and lower conveyor is precisely controlled by mechanical, hydraulic or electrical forces, while conveying product forward. The upper conveyer moves laterally at a speed controlled independently from other functions on the conveyor. The later motion is controlled by a counter weight. The combined motion of the upper conveyor is created by a drive system comprising pulleys or sprockets, with a roller allowing lateral motion of the drive shaft while allowing the belt to move forward. The combination of the motions create a multi-dimensional rolling effect which creates the meatball with greater precision.

It is an object of the present invention for the machine to create lateral dispersal on the lower conveyer so that the machine positions the meatballs in a manner to be more efficiently cooked, fried, frozen or dehydrated.

DETAILED DESCRIPTION OF THE INVENTION

Figure 1:
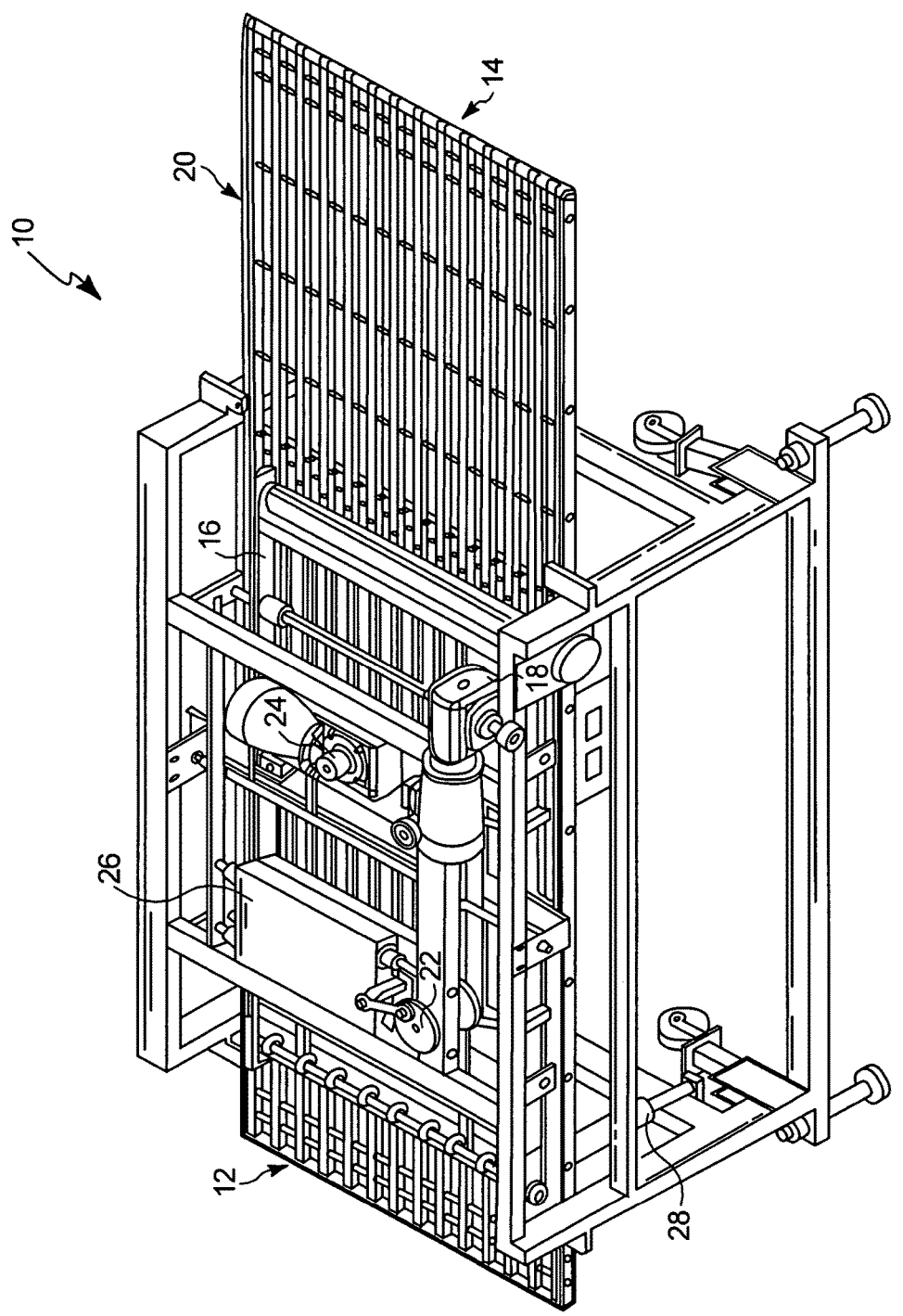
FIG. 1 is a top view of the meatball conveyer of the present invention.

FIG. 1 shows a top view of the meatball conveyer 10. The meatball conveyer has an input end 12 and an output end 14. FIG. 1 shows the upper conveyer 16 with an upper conveyer motor and drive 18. The lower conveyer motor and drive is found below the arrow 20 and is not viewable from this angle. The meatball conveyer 10 further comprises a transverse motion cam and arm 22 a transverse motion motor 24 and a transverse motion counterweight 26. The conveyer further comprises a hydraulic fine adjustment 28.

Figure 2:
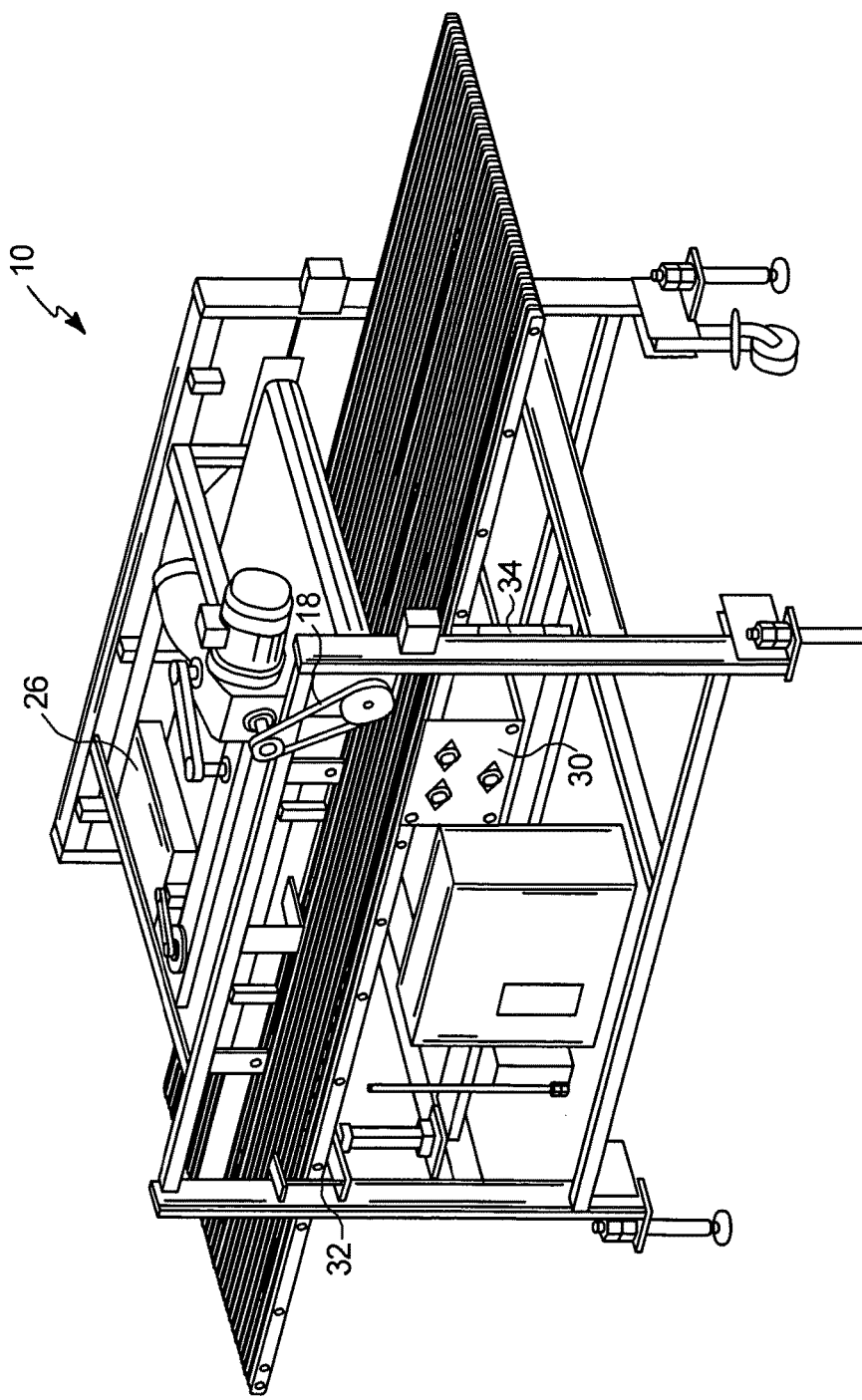
FIG. 2 is a side view of the meatball conveyer of the present invention.

FIG. 2 shows a side view of the meatball conveyer 10 having an upper conveyor drive 18, a lower conveyer drive 30, and counterweight 26. The conveyer 10 further comprises vertical adjustment system 32 and 34.

Figure 3:
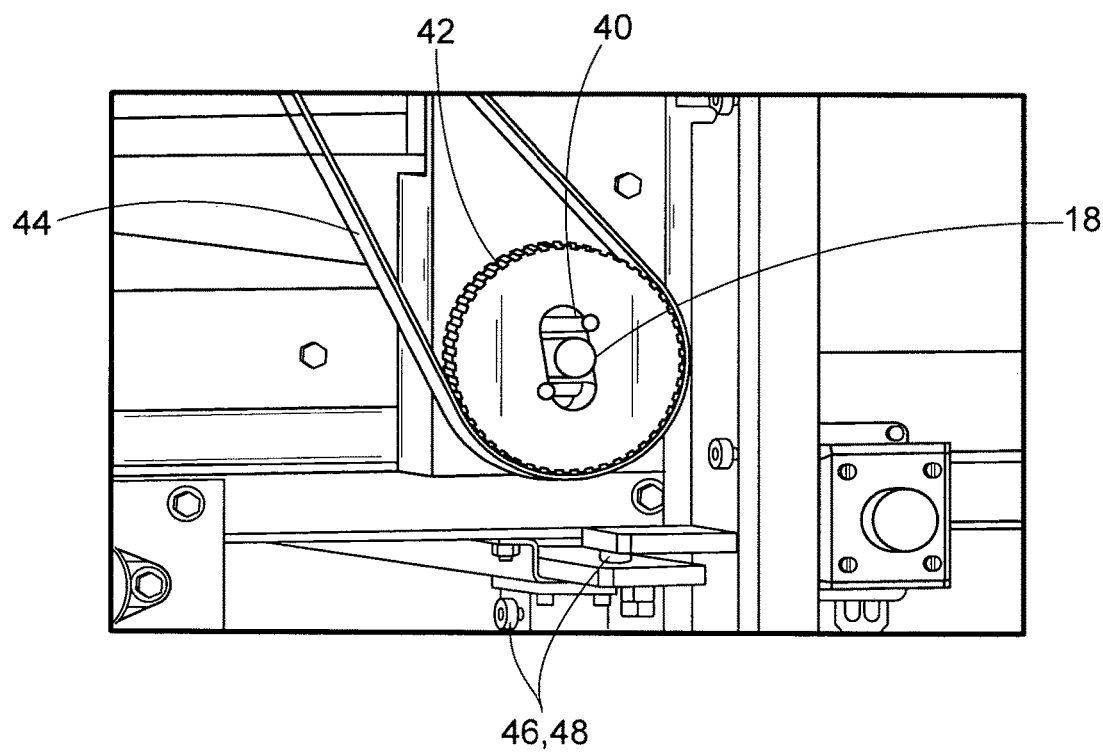
FIG. 3 is a side view of the pulley/sprocket system of the present invention.

FIG. 3 shows the upper conveyor drive system 18 comprising rollers 40, a pulley or sprocket 42, and a belt 44. FIG. 3 further shows lower conveyer precision adjusting units 46 and 48.

Figure 4:
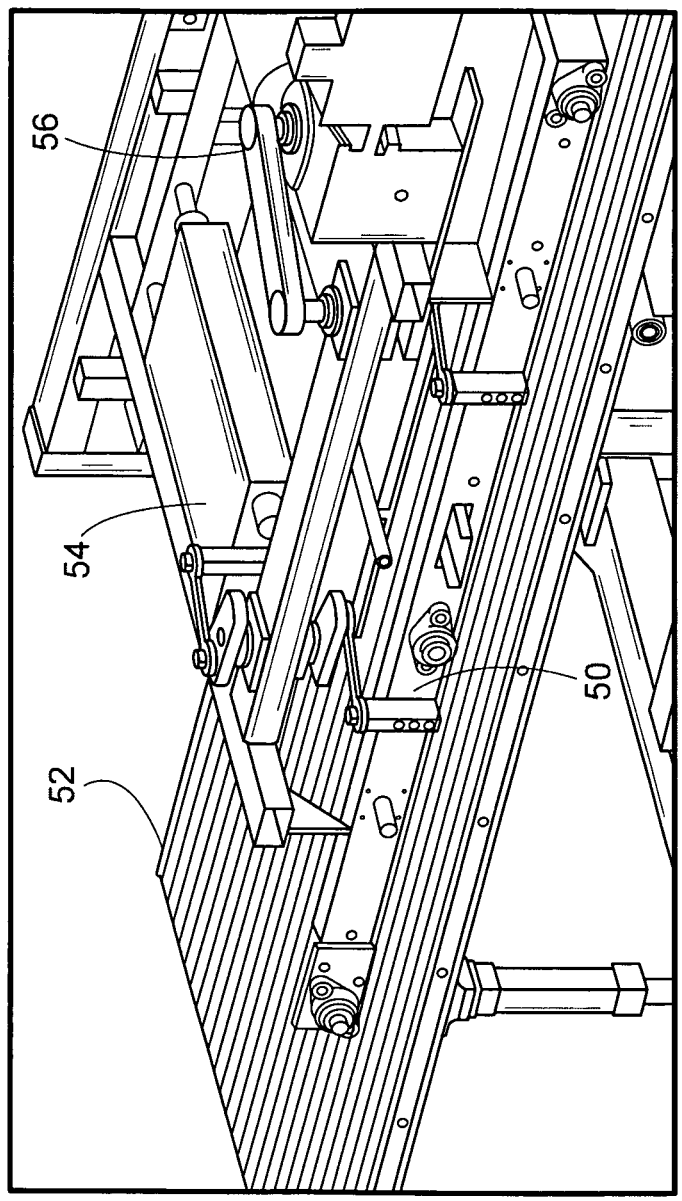
FIG. 4 is a side view of the meatball conveyer of the present invention.

FIG. 4 shows a side view of an upper conveyer 50, a lower conveyer 52, counter weight system 54 and lateral motion drive 56.

Figure 5:
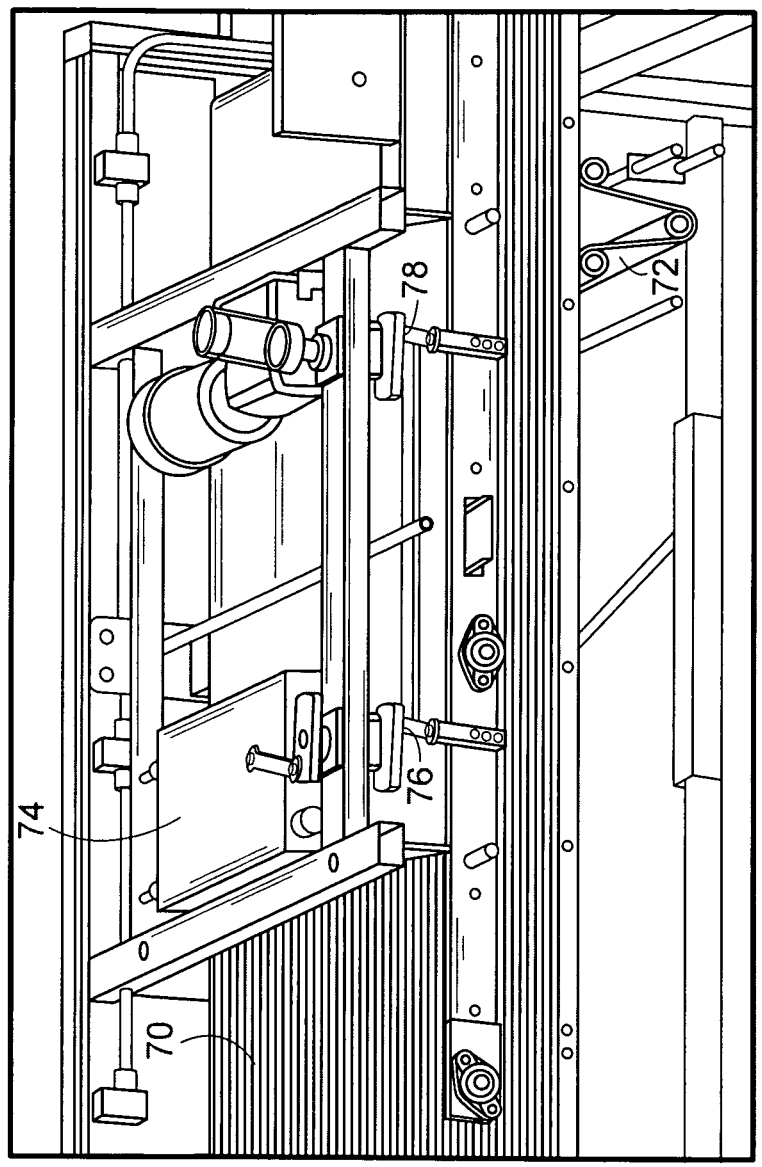
FIG. 5 is a top view of the meatball conveyer of the present invention.

FIG. 5 shows a top view of the conveyer system having upper conveyer 70, lower conveyer 72, counterweight 74 and reciprocating linkages 76 and 78.

The invention claimed is:

1. A product conveyer system which moves patties, meatballs, or other shaped meat products from a forming machine or other processing machine comprising:
    an upper conveyor that drives a belt longitudinally using a drive unit while said upper conveyor reciprocates laterally;
    a lower conveyor;
    a transverse drive which moves said upper conveyer at a right angle to direction of travel;
    said upper conveyor moving at a higher longitudinal speed than said lower conveyor;
    said upper conveyer forms said meat products into spherical shapes, wherein said upper conveyer is smaller laterally than said lower conveyer and said upper conveyer reciprocates laterally which force is dampened by a counter weight system, thereby imparting a multi-direction motion on said respective meat product which creates a spherical shape while dispersing said respective meat product laterally on said lower conveyer.

2. The system of claim 1 further comprising a hydraulic adjusting mechanism.

3. The system of claim 1 further comprising said counter weight which minimizes vibration imparted by lateral motion.

4. The system of claim 1 wherein motions of said upper conveyor and said lower conveyer disburse said meat product laterally before going into a cooking, frying, baking, freezing or dehydration process.

5. The system of claim 1 wherein said upper conveyer is smaller laterally than said lower conveyer and said upper conveyer reciprocates laterally which force is dampened by the counter weight system, by a mechanical, hydraulic, electrical or pneumatic power.

6. The system of claim 1 further comprising a vertical adjustment between said upper conveyor and said lower conveyer.

7. The system of claim 1 wherein lateral dispersion of product on said lower conveyer is caused by a multi-directional rolling action.

8. The system of claim 1 wherein lateral dispersion is controlled by conveyer settings.

9. The system of claim 1 wherein said pulley or sprocket has an opening in center so a drive shaft moves laterally within said pulley or sprocket while imparting forward motion on said belt.

10. The system of claim 9 further comprising two rollers to contact interior of said sprocket or pulley to drive unit to impart two directions of motion, longitudinally to said belt while accommodating lateral motion to said upper conveyer.

11. The system of claim 1 wherein said lower conveyer is driven by a power source independent of other conveyer functions which controls longitudinal speed of belt on said lower conveyer.

12. The system of claim 1 further comprising an apparatus which controls distance between said upper conveyor and said lower conveyer.

13. The system of claim 1 wherein said upper conveyer has an independent power source which controls longitudinal speed.

14. The system of claim 1 wherein said upper conveyer is laterally narrower than said lower conveyer.

15. The system of claim 1 wherein said upper conveyer reciprocates laterally at a speed which is independently controlled from other functions of said conveyer.

16. The system of claim 1 wherein said upper conveyer moves laterally while driving belt longitudinally by a system of pulleys, sprockets, rollers and a reciprocating shaft.

17. The system of claim 1 wherein between said upper conveyor and said lower conveyor, said respective meat product is rolled to a shape and weight and laterally dispersed on said lower conveyor.

18. A system for conveying various meat shapes comprising:
    a lower conveyer;
    an upper conveyer that drives a belt longitudinally while said upper conveyor reciprocates laterally;
    said lower conveyer holding product having various shapes deposited on said lower conveyor;
    said lower conveyor controlled by independent speed controls;
    said upper conveyor is independently controlled to move at a faster longitudinal speed than said lower conveyor, wherein said upper conveyor is smaller laterally than said lower conveyor and said upper conveyor reciprocates laterally which force is dampened by a counter weight system, thereby imparting a multi-direction motion on meat product which creates a spherical shape while dispersing said meat product laterally on said lower conveyer.

19. The system of claim 18 wherein distance between said upper conveyor and said lower conveyor is controlled by mechanical, hydraulically or electrical forces, while conveying product forward.

20. The system of claim 18 wherein said upper conveyer moves laterally at a speed controlled independently from other functions on said upper conveyor.

21. The system of claim 20 wherein lateral motion is controlled by the counter weight.

22. The system of claim 18 wherein said upper conveyor is driven by a drive system comprising pulleys or sprockets, with a roller causing lateral motion of a drive shaft while causing a belt to move forward.

23. A system for conveying meat product comprising:
    an upper conveyor having a first motor and a first drive that drives a belt longitudinally while said upper conveyor reciprocates laterally;
    a lower conveyer having an input end, an output end, a second motor, and drive;
    said first motor and said second motor adjusting said upper conveyer and said lower conveyer separately;
    a counterweight that minimizes vibration imparted by lateral motion;
    a vertical adjustment system; said upper conveyor moving at a higher longitudinal speed than said lower conveyer, wherein said upper conveyor is smaller laterally than said lower conveyer and said upper conveyor reciprocates laterally which force is dampened by the counter weight system.

24. The system of claim 23 wherein said upper conveyor comprises a drive system comprising rollers, a pulley or sprocket, and a belt.

25. The system of claim 23 wherein said lower conveyer system further comprises adjusting units.

26. The system of claim 23 further comprising reciprocating linkages.

27. The system of claim 23 further comprising a lateral motion drive.

28. The system of claim 23 further comprising a hydraulic adjustment.

29. The system of claim 23 further comprising a transverse motion cam and arm, a transverse motion motor, and a transverse motion counterweight.

* * * * *